Patented Oct. 1, 1940

2,216,406

UNITED STATES PATENT OFFICE 2,216,406

PROCESS OF TREATING TEXTILES

Paul R. Austin, Wilmington, Del., assignor to E. I. du Pont de Nemours & Company, Wilmington, Del., a corporation of Delaware No Drawing. Application September 29, 1938, Serial No. 232,466

3 Claims. (Cl. 8—113)

This invention relates to polymeric materials and more particularly to a process for imparting water-repellent characteristics to synthetic linear polyamide products.

An object of this invention is to improve the water repellency of synthetic linear polyamide materials, particularly fabrics. Another object is to impart a softer feel to synthetic polyamide fabrics. Other objects will appear hereinafter.

These objects are accomplished by treating either by coating or impregnating the synthetic linear polyamide material with a quatenary ammonium compound of the type more particularly pointed out below.

The polyamide fabrics, filaments, fibers, etc., used in the practice of this invention are those described in Patents 2,071,250, 2,071,253, and 2,030,948. These polymers are characterized by the fact that they can be formed into filaments which yield oriented fibers on application of tensile stress, hereinafter referred to as "cold drawing," and are further characterized by their microcrystalline nature as evidenced by their sharp melting points and the type of diffraction patterns they furnish on X-ray examination. Of these polymers the polyamides in which the amide groups form an integral part of the main chain of atoms are the most useful for the preparation of fibers, bristles, ribbons, sheets, and the like. These polyamides are of two types, those obtainable from polymerizable monoaminocarboxylic acids and their amide-forming derivatives, and those obtainable from the reaction of suitable diamines with suitable dibasic carboxylic acids or amide-forming derivatives of dibasic carboxylic acids. These polyamides are referred to as "synthetic linear condensation polyamides," a term which is intended to include polymers of the same composition or their equivalent when produced by reactions which are not strictly chemical condensations, and to include polyamides containing other groups such as ester or amide groups obtained by including with the polyamide-forming reactants other bifunctional reactants. On hydrolysis with mineral acids, these polyamides revert to the bifunctional reactants from which they are derived. For example, a polyamide derived from a diamine and a dibasic acid yields on hydrolysis with hydrochloric acid the dibasic acid and the diamine hydrochloride.

The synthetic polyamides used in this invention are obtained when the polymerization reaction has been carried to the degree necessary to obtain a high molecular weight product, the filaments of which can be drawn into oriented fibers, showing by X-ray examination molecular orientation along the fiber axis. The fiber-forming stage may be easily determined by touching the molten polyamide with a rod and drawing the rod quickly away; if the fiber-forming stage is reached a filament of considerable strength will be drawn from the molten polymer. This stage is reached essentially when the polyamide has an intrinsic viscosity of about 0.4, where intrinsic viscosity is defined as $$\frac{\log_e \eta \gamma}{C}$$

in which $\eta \gamma$ is the viscosity of a dilute solution (e. g., 0.5% concentration) of the polymer in m-cresol divided by the viscosity of m-cresol in the same units and at the same temperature (e. g., 25° C.) and C is the concentration in grams of polymer per 100 cc. of solution.

Synthetic linear polyamides can be spun into continuous filaments in a number of ways. One method consists in dissolving the polyamide in a suitable solvent and extruding the resulting solution through orifices into a liquid which dissolves the solvent but not the polyamide, and continuously collecting the filaments thus formed on a suitable revolving drum or spindle. Another method consists in extruding a solution of the polyamide into a heated chamber where the solvent is removed by evaporation. Still another method consists in extruding the molten polyamide through orifices into a cooling atmosphere where it congeals into a filament. It is advantageous to subject the filaments thus formed subsequently to a cold drawing process, for example stretching below the melting point of the filament. The elongation is accompanied by a progressive increase in tensile strength until a definite limit is reached beyond which the application of additional stress causes the fiber to break. The cold drawn filaments remain permanently extended; they are much stronger than the material from which they are drawn, more elastic, and when examined by X-rays they furnish a sharp diffraction fiber pattern. These fibers can be doubled and/or twisted into threads or yarns suitable for the manufacture of fabrics.

The present invention consists in treating fibers, threads, yarns, or fabrics, prepared from synthetic linear polyamides with a quaternary compound of the general formula

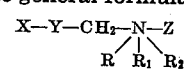

wherein X is an aliphatic radical having not less than 6 carbon atoms, and may be a saturated or unsaturated hydrocarbon radical; also it may be the radical of an aliphatic carboxylic acid; that is, it may have the form R'CH₂— or R'—CO, wherein R' is an aliphatic hydrocarbon radical of not less than 5 carbon atoms; Y is a grouping of the class consisting of —O—, —S— and —NR''—, where R'' is hydrogen or an organic radical; the grouping

may represent the residue of a tertiary aliphatic base, or may stand for the residue of a heterocyclic base such as pyridine or quinoline; and Z stands for the monovalent anion of an acid, for example of hydrochloric, hydrobromic, nitric, sulfuric, p-toluenesulfonic acids, and the like.

It has been found that when a polyamide textile material is subjected to treatment with a quaternary ammonium compound as defined above, under conditions whereby the material is first made to take up from 0.1% to 2.0% of its own weight of this compound and then the compound is decomposed upon or within the fiber in the absence of moisture, the material acquires valuable surface characteristics, the most important of which is relatively permanent water repellency. The effect may be more fully described by stating that when the material is, for instance, in the form of closely woven fabric, a drop of water dropped onto the surface of the fabric assumes a globular shape and tends to roll off readily. For example, woven polyamide fabrics treated under suitable conditions with these compounds become shower-proof; and this property, furthermore, is unaffected or not seriously affected by exposure to the weather or by laundering, dry-cleaning, or other cleansing operations. These compounds likewise impart a soft feel or handle to yarns and fabrics and aid in the recovery of woven fabrics from creasing. Although in this invention the water-repellent process may be applied to the treatment of polyamide fibers in any stage of their manufacture into yarns or fabrics, it is particularly directed to improving the properties of woven materials.

The treatment of polyamide textile material with the above reagents may be readily effected from a solution or a suspension of said reagents in a liquid medium. The quaternary ammonium compound is dissolved or suspended in a liquid medium such as water or a neutral organic solvent, and the polyamide material is impregnated with this solution at low temperatures, usually not over 40° C., by passing it through or dipping it into the solution, the mechanical handling being suited to the nature of the material. The material is then dried so as to avoid excessive decomposition of the quaternary compounds, usually at low temperatures, for example not over 40° C., or with a rapid rate of drying as effected by circulating a current of dry air around the impregnated material, or both. The dried impregnated material is then "baked" at a temperature which favors the decomposition of the quaternary compound. This temperature may vary from 70° C. to 200° C., depending on the particular compound employed and on the duration of the baking treatment, but in the average case the preferred temperature is somewhere between 100° and 160° C., which is maintained for a period of from 2 to 45 minutes.

In the case of some compounds endowed with a particular degree of stability the intermediate drying step may be omitted, i. e., the drying step is gradually merged into the baking step at the optimum temperature of the latter. Typical compounds of this sort are derivable from aliphatic acid amides of the general formula

the symbols R',

and Z being defined as above.

The baking step is essential for the production of permanent water-repellent properties. During the baking treatment there is decomposition of the salt which is manifested when a pyridinium compound is used by there being generated an odor of pyridine.

The following examples illustrate the invention more specifically:

*Example I*

A sample of knitted stocking fabric composed of yarn spun from polyhexamethylene adipamide, and cold drawn, was immersed in a 2% aqueous solution of stearamidomethylpyridinium chloride at 40° C. for 15 minutes. After squeezing excess solution from the sample, it was dried at room temperature, then baked in an oven for 30 minutes at 150° C. The treated fabric had a softer, more pleasant feel than an untreated control sample. Measurement by a spray test (Am. Dyestuff Reporter, 26, 323 (1937)) was made involving the use of a constant five-foot head of water and determination of the percentage of water absorbed by the fabric. The water absorption of the treated fabric was found to be 6.2% by weight before, and 22% after 30 washings, as compared with 100% by weight for the unwashed, untreated fabric. The treated sample of fabric likewise showed an improvement in recovery from creasing over an untreated control.

*Example II*

A sample of fabric woven from yarn spun from polyhexamethylene adipamide, cold drawn, and having an uncrimped warp and a crimped weft, was impregnated with a 2% aqueous solution of stearoxymethylpyridinium chloride prepared from crude stearyl alcohol obtained by hydrogenation of the higher acids from coconut oil. After pressing out excess solution, the sample was dried at room temperature and baked in an oven at 110° C. for 30 minutes. As tested by dropping water on the material the treated sample showed a good degree of water repellency which was not present in an untreated sample and possessed a softer, more pleasant feel.

The compounds corresponding to the general formula above and used in the above examples may be prepared by methods outlined in British Patents 475,170, 475,119, 390,553, and 394,196.

In a manner similar to the above examples, other compounds following the formula above-indicated may be used for the purposes of this invention; for example: stearamidomethylpyridinium bromide, stearamidomethylpyridinium nitrate, stearamidomethylpyridinium m-nitrobenzene sulfonate, oleylamidopyridinium chloride, lauramidomethylpyridinium chloride, lauramidomethylpyridinium sulfate. Other compounds which may be used in accordance with the invention include cetyloxymethylpyridinium chloride, cetyloxymethylpyridinium bromide, dodecyloxymethylpyridinium chloride, tetradecyloxymethylpyridinium chloride, octadecyloxymethylpyridinium chloride, dodecyloxymethyltriethyl ammonium chloride, octadecyloxymethyl-quinolinium chloride, and the like. Fibers, yarns and fabrics prepared from other fiber-forming polyamides may be treated in accordance with this invention. For example, polypentamethylene adipamide, polyhexamethylene adipamide, polyoctamethylene adipamide, polydecamethylene adipamide, polypentamethylene suberamide, polyhexamethylene suberamide, polydecamethylene suberamide, polypentamethylene sebacamide, polyhexamethylene sebacamide and polyoctamethylene sebacamide. Further compounds include polytetramethylene sebacamide, polypentamethylene adipamide, polyhexamethylene glutaramide, polydecamethylene carbamide, poly-p-xylylene sebacamide. Polymerized 6-aminocaproic acids, polymerized 9-aminononanoic acid, and polymerized 11-aminoundecanoic acid and the polymer formed from caprolactam are additional examples of linear polyamides which may be used. Copolyamides or interpolyamides and likewise mixtures of polyamides in the form of fibers or woven fabrics may be rendered water repellent according to this invention. Likewise polyamides which contain modifying agents such as luster-modifying materials, pigments, dyes, antioxidants, oils, antiseptics, cellulose derivatives, and such, may be treated to acquire water repellency in accordance with this invention.

The concentration of the treating agent in the aqueous solution may vary from 0.01% to 10% or even higher if desired. The quantity of the agent applied with respect to the weight of fiber treated may be so chosen by controlling the amount of solution left upon the fiber after the bulk of the liquid has been squeezed out.

While it is generally most convenient to immerse or dip the polyamide fabric in a solution or suspension of the quaternary ammonium compound, it will be obvious that the polyamide product can be sprayed with the treating solution or suspension.

Water-repellent polyamide fabrics of a high degree of usefulness for the preparation of raincoats, shower curtains, hospital sheeting, and the like may be prepared according to this invention. Furthermore, the application of this process to polyamide fabrics has a particular advantage over the application to cellulosic materials in that the polyamide fabric is not tendered by heating in the presence of a quaternary ammonium salt and strong water-repellent polyamide fabrics may thus be obtained.

As many apparently widely different embodiments of this invention may be made without departing from the spirit and scope thereof, it is to be understood that I do not limit myself to the specific embodiments thereof except as defined in the appended claims.

I claim:

1. The process of enhancing the water-repellence and softness of feel of a textile fabric containing filaments of polyhexamethylene adipamide, which process comprises impregnating the fabric with an approximately 2% solution of a member of the class consisting of stearamidomethylenepyridinium chloride and stearoxymethylenepyridinium chloride, removing the excess solution by squeezing and then baking the fabric for at least thirty minutes at a temperature in excess of 150° C.

2. The process of enhancing the water-repellence and softness of feel of a knit textile fabric containing polyhexamethylene adipamide yarn, which process comprises the steps of impregnating the fabric with an approximately 2% aqueous solution of stearamidomethylenepyridinium chloride, removing the excess solution by squeezing, and then baking the fabric for at least thirty minutes at a temperature in excess of 150° C.

3. The process of enhancing the water-repellence, crease-resistance and softness of feel of a woven textile fabric comprising yarn containing filaments of polyhexamethylene adipamide, which process comprises impregnating the fabric with an approximately 2% solution of stearoxymethylenepyridinium chloride, removing the excess solution by squeezing and then baking the fabric for at least thirty minutes at a temperature in excess of 150° C.

PAUL R. AUSTIN.